US012530945B2

(12) United States Patent
Lockton et al.

(10) Patent No.: US 12,530,945 B2
(45) Date of Patent: Jan. 20, 2026

(54) METHOD AND SYSTEMS FOR REDUCING RISK IN SETTING ODDS FOR SINGLE FIXED IN-PLAY PROPOSITIONS UTILIZING REAL TIME INPUT AND ARTIFICIAL INTELLIGENCE

(71) Applicant: Winview IP Holdings, LLC, Charlotte, NC (US)

(72) Inventors: David B. Lockton, Charlotte, NC (US); Kathy A. Lockton, Charlotte, NC (US)

(73) Assignee: Winview IP Holdings, LLC, Charlotte, NC (US)

( * ) Notice: Subject to any disclaimer, the term of this patent is extended or adjusted under 35 U.S.C. 154(b) by 0 days.

(21) Appl. No.: 19/177,349

(22) Filed: Apr. 11, 2025

(65) Prior Publication Data

US 2025/0239141 A1 Jul. 24, 2025

Related U.S. Application Data

(63) Continuation-in-part of application No. 17/721,983, filed on Apr. 15, 2022, which is a continuation of application No. 16/276,292, filed on Feb. 14, 2019, now Pat. No. 11,308,765.

(60) Provisional application No. 62/742,593, filed on Oct. 8, 2018.

(51) Int. Cl.
*G07F 17/32* (2006.01)
*A63F 13/798* (2014.01)

(52) U.S. Cl.
CPC ........ *G07F 17/3288* (2013.01); *G07F 17/323* (2013.01); *G07F 17/3244* (2013.01); *G07F 17/3276* (2013.01); *A63F 13/798* (2014.09); *G07F 17/3239* (2013.01)

(58) Field of Classification Search
CPC ............. G07F 17/3239; G07F 17/3276; G07F 17/323; G07F 17/3244; G07F 17/3288; A63F 13/798
See application file for complete search history.

(56) References Cited

U.S. PATENT DOCUMENTS

2001/0031654 A1 10/2001 Walker
2002/0115489 A1* 8/2002 Jordan .................... A63F 13/30 700/91
2003/0014275 A1 1/2003 Bearden
2004/0244057 A1* 12/2004 Wallace ............. H04N 21/8173 725/135
2018/0025586 A1* 1/2018 Lockton .............. G07F 17/3288 463/42
2022/0237989 A1* 7/2022 Lockton .............. G07F 17/3209

* cited by examiner

*Primary Examiner* — William H Mcculloch, Jr.
(74) *Attorney, Agent, or Firm* — Haverstock & Owens, A Law Corporation

(57) ABSTRACT

A skill game operator provides real time propositions to a viewing audience, and based on the input received from those propositions, comparable In-Play wagering propositions are able to be generated, and the odds of the In-Play propositions are able to be accurately adjusted based on the actual input received from the same participating audience the skill game operator's responses to the same propositions.

22 Claims, 6 Drawing Sheets

METHOD AND SYSTEMS FOR REDUCING RISK IN SETTING ODDS FOR SINGLE FIXED IN-PLAY PROPOSITIONS UTILIZING REAL TIME INPUT AND ARTIFICIAL INTELLIGENCE

CROSS-REFERENCE TO RELATED APPLICATION(S)

This application is a continuation-in-part application of co-pending U.S. patent application Ser. No. 17/721,983, filed on Apr. 15, 2022, and titled, "METHOD AND SYSTEMS FOR REDUCING RISK IN SETTING ODDS FOR SINGLE FIXED IN-PLAY PROPOSITIONS UTILIZING REAL TIME INPUT," which is a continuation application of U.S. patent application Ser. No. 16/276,292, filed on Feb. 14, 2019, and titled, "METHOD AND SYSTEMS FOR REDUCING RISK IN SETTING ODDS FOR SINGLE FIXED IN-PLAY PROPOSITIONS UTILIZING REAL TIME INPUT," which claims the benefit of U.S. Provisional Patent Application Ser. No. 62/742,593, filed Oct. 8, 2018 and titled "METHOD AND SYSTEMS FOR REDUCING RISK IN SETTING ODDS FOR SINGLE FIXED IN PLAY PROPOSITIONS UTILIZING REAL TIME INPUT," which are all hereby incorporated by reference in their entireties for all purposes.

FIELD OF THE INVENTION

The present invention relates to the field of computer analysis. More specifically, the present invention relates to the field of computer analysis related to gaming.

BACKGROUND OF THE INVENTION

With repeal of PASPA, sports betting in the U.S. is projected to be ultimately legalized in up to 33 states in the next ten years, with over $60-100 billion projected to generate in gross gaming revenues from live In-Play or In Running wagers. Live betting already constitutes over 70% of the estimated $175 billion sports betting industry.

For sports betting companies such as consumer facing William Hill, MGM, or live betting data suppliers such as Betradar and BetGenius, the challenges in generating consistent profit margins on wagers while games are in progress are different than the challenges facing a cash skill game provider such as WinView-www.winviewgames.com. With WinView's proposition based legal games of skill, the accuracy of the odds set on "Yes" "No" In-Play propositions produced by WinView's live producers have no effect on WinView's revenues. WinView conducts paid entry contests and tournaments of skill between the entrants and charges a set management fee or "rake" for providing the service. Their fee is the same regardless of the outcome of a single proposition or multiple propositions in the contests of skill.

In traditional legalized pre-game fixed odds "outcome" betting, ("Who will win the first half"?) the bookmaker generally adjusts the odds as the bets are booked, with a goal of balancing its financial risk of being on the wrong side of an unbalanced book. Having all wagers placed on one team would cause potential catastrophic losses if that team won, because unlike in the WinView skill game system, each individual bet is against the house. For traditional pre-game outcome betting, e.g., "who will win?" with points spreads, "over and under" points, bookmakers attempt to balance odds based on the amount of money wagered on the two (or more) options of the wager with the goal of putting the bookmaker in a position where they are indifferent to which side of the wager pays off. This is accomplished by adjusting the odds to attract wagers on the less favored side of the proposition.

The Problem for in-Play Betting

In live sports betting, unlike WinView, the punter is wagering directly against the house. The more frequently live betting propositions are produced, the more potential profit. Bookmakers presenting live betting must think and work quickly to optimize accuracy in selecting the appropriate situational proposition and then set the accompanying odds to optimize returns immediately and present it to the bettors. This is extremely challenging. Each game is unique, and each moment of the game lends itself to a unique question about "what is going to happen next." The closer a live proposition is to what the collective viewing audience is thinking about what's going to happen next, the more participation it will generate. Entertaining and entrancing propositions are customized to the immediate situation on the field and are often unique one of a kind. With legal sports books, however, the frequency and relevancy of the live propositions to be presented are restricted by the risk they involve.

With no prior historical data on the exact game situation, and without any knowledge of the betting TV audience's collective wisdom expressed by actual "voting" with their wallets on a proposition as with pre game outcome betting, optimally setting the odds for each unique short-term In-Play proposition under severe time pressure is currently based on the level of sophistication, relevancy, speed and accuracy of the data and sophisticated software systems, combined with subjective judgment of the live bookmakers.

As referenced below, "In Running" betting is the term utilized herein to describe wagers where the wording of the proposition is unchanged after offered, e.g., "Who will win the first quarter?" With each major change in the probabilities created through, for example, a score in a soccer game, the acceptance of new wagers is briefly suspended at the server while the new odds are recalculated and betting on that proposition is reopened with new odds.

With the "In-Play," now referred to as micro betting, version of live bookmaking, unlike traditional outcome betting, the permanent odds for each successive proposition must be quickly set without any direct feedback about the betting audience's collective betting response as the game action continues. Micro betting includes propositions that are presented during live gameplay and are open for a limited amount of time, such as "will Football Team X score on the current drive?" The fundamental method of risk elimination for non-live outcome bookmaking, as described in the previous paragraph is not available, and the lockout for that proposition comes within a matter of seconds after presentation.

Live In-Play bookmakers, in order to maximize the TV betting audience's collective focus on the "in the moment" game state, generate an In-Play proposition that reflects the unique and generally one-of-a kind game situation—("Will the Colts score on the next play?"-"Will the ruling on the field be overturned?") and depending on the sport, set the odds within 5-10 seconds, varying by whether there is, for example, a time out, commercial break, replay, injury or ongoing action as in soccer. Today live book makers utilize a combination of AI driven computer programs utilizing machine learning and neural networks which rely on historic performance data and probabilities, real time analysis of the in progress game's statistics, historical data on the experience with the same or similar proposition, analysis of competitor bookmakers odds, and human experts who evaluate all these sources available and the computer systems' recommendations. Finally, the bookmakers optionally utilize their own judgment to modify or select the recommended odds, within a matter of seconds. One bookmaker's methods are reflective of the industry are described in Appendix A of the U.S. Provisional Patent Application No. 62/742,593, an article from the EGM Sports Betting 2017 report referenced above. This method limits not only the frequency, but also the flexibility and creativity in creating live customized propositions by limiting the live betting possibilities to a pre-produced standard list where sufficient historic data exists to yield AI computer generated odds with an acceptable risk factor. The result is fewer, more repetitive generic propositions and the desired maximization of return is not infrequently achieved.

SUMMARY OF THE INVENTION

A method and apparatus relates to micro sports betting where the odds on In Play propositions are readjusted based on the actual input from the same participant audience. The input utilized is expanded from results from the contest's SGO audience's response and the response to the proposition by a panel of experts, to include responses from the same audience to the same or similar prior proposition in the same contest received by the SBO.

A real-time, two screen skill game operator like WinView, presents propositions to the viewing audience, and based on the collective predictive input received from those propositions, comparable In-Play sports betting propositions are able to be generated, and the odds of the In-Play betting propositions are able to be adjusted based on the actual reaction of the same audience of potential customers to input received from the skill game operator's propositions to optimize the separate single proposition's odds.

DETAILED DESCRIPTION OF THE PREFERRED EMBODIMENT

Figure 1:
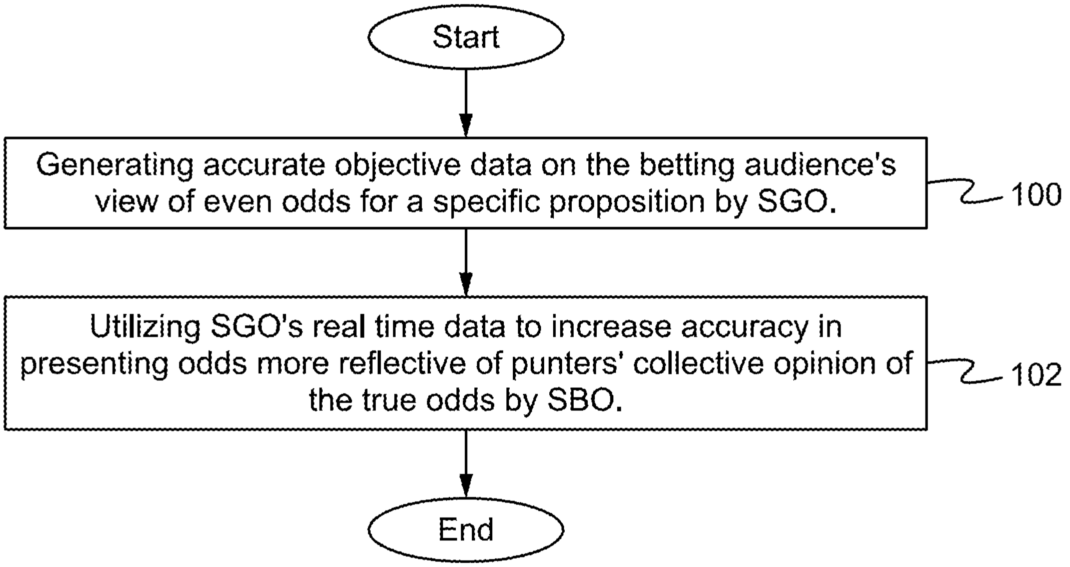
FIG. 1 illustrates a flowchart of a method of utilizing SGO data to optimize SBO propositions according to some embodiments.

A skill cash game operator offering proposition-based games of skill based on the overall performance over a set of 20-30 propositions in a skill contest like WinView offers is referred to as an "SGO" for Skill Game Operator. A legal sports book offering live betting will be referred to as an "SBO" or Sports Betting Operator.

Real time analytics programs utilizing real time data for individual and team on the on-field performances, combined with massive historical statistics relative to the probability of a specific In-Play betting proposition important to In-Play bookmaking is an important innovation in live fixed-odd bookmaking. For example, for a proposition on the likelihood of the Patriots, playing the Colts at home, to score on a possession within the "Red Zone," the system can generate odds for each proposition sufficiently accurate enough to substantially reduce financial exposure. But these odds will not be consistently as effective in achieving the ideal of a 50/50 split on the "Yes" or "No" amounts wagered, or optimize the bookmakers return, as unlike outcome betting, the bookmaker's odds can only be set once in a matter of seconds, and bets cannot be accepted until the proposition with these fixed odds are published. In In Running wagers, bookmakers immediately see the response to the odds and as the contest unfolds, can close or lock out the previous proposition and course correct by offering new odds proposed by their Artificial Intelligence (AI) systems, constantly maximizing potential return for this segment of live betting. The bookmakers' most fundamental tool in traditional pre-match outcome betting: the ability to utilize actual bets placed on the current odds offered to adjust the odds to balance the book, or to lay off or hedge their portfolio, is not available.

In a hypothetically ideal system, a live sports bookmaker might be able, after utilizing all the expert systems and real-time tools at their disposal, to set the "initial" odds for an In-Play proposition and present these preliminary odds to the existing betting universe for that proposition. Then, based on the collective response of this actual wagering market, revealing the wisdom of the actual universe of the skilled and unskilled punters, the exact target for the SBO, the bookmaker would feed the actual result data received on how the skill game competitors collectively responded to the originally proffered odds into an AI-based software system to instantly recalculate significantly more accurate, if not optimal odds. These new empirically adjusted odds would then be formally presented to the same betting universe as the actual betting odds, and all of this is accomplished in a timely manner which does not antagonize the betting audience.

Described herein are the methods and systems to optimize In Play wagering returns utilizing, three separate sources of responses: 1) the capabilities of a Skill Game Operator's (SGO) paid entry contests of skill such as WinView's, to provide an In-Play wagering service offered by a Sports Betting Operator (SBO) with the optimum odds setting capability for In-Play wagers, offered simultaneously to the same audience for the televised athletic or other type of contest being offered by both services; 2) a statistically significant panel of selected paid or unpaid viewers could enter their inputs which would be representative of the larger audience watching the game. This "panel" could also be comprised of expert bookmakers or sports bettors whose collective input would be used; and 3) the betting response to the odds set by the SBO to the same or similar micro betting proposition during the same sporting event.

As used herein, propositions are able to be generated for sports events, esports events, athletic events, non-athletic events and occurrences, televised events and occurrences, live events and occurrences and recorded events and occurrences.

Overview

The primary application of one system utilizes the direct cooperation of the "SGO" and the "SBO." The SGO's live game producers, following its In-Play proposition setting procedures would generate the wording of the contemplated live proposition, arbitrarily setting what their data and experience indicates has a probability of achieving as close as possible to a 50/50% distribution between "Yes" and "No." Immediately after the proposition is published, the SGO's audience begins to "vote" with their predictions on the "yes" or "no" wagers at the odds that were set in real time by the SGO's audience, for example, "Will the Patriots score on this drive?" If in setting these odds, from their prior data and experience, the SGO's human bookmakers (game producers) determined the true odds were 40% "Yes" and 60% "No," the odds for one betting unit would be "2.5" for "Yes" and "1.67" for "No."

Simultaneously, the SBO (with or without the teachings herein) is utilizing their sophisticated AI computer systems dedicated to coming as close as possible to optimizing their financial return on the yes/no option of a proposition using identical wording. But, the most sophisticated real time data tools and software, even utilizing analysis of the unfolding game statistics to get a sense of what the viewing audience thinks the probabilities are, does not come close to the actual audience's behavior these systems are attempting to predict. The only way to predict such complex behavior is to capture the actual response of the identical targeted television audience displaying the "wisdom of crowds." This wisdom in turn results from the potential betting audience observing and experiencing the same game's unique unfolding facts relevant to the proposition in question, such as the personnel and formations on the field, injuries, wind and weather conditions and momentum and the bias based on the percent of cash players who are fans of one team or the other. The sophisticated AI, neural network-based odds setting system is dedicated to estimating what the viewing audience will do with their money at stake within a 5-second window, and one chance to get it right.

The system described herein enables a procedure where live betting odds are set with real time input from the same betting viewing audiences' actual response to the SGO's prop which is effectively utilized as a test proposition to provide a target audience's response to recast the critical odds for actual In-Play and In Running propositions resulting in significantly improved ability of the bookmaker to optimize bookmaking return.

The Participating SGO Generates Accurate Objective Data on the Betting Audience's View of "Even Odds" for a Specific Live Proposition.

WinView is a company offering games of skill based on the real-time offering of In-Play propositions to TV viewers. The contests qualify as games of skill because the winnings of the cash entry fees are distributed to the winners based on the overall performance in selecting a series of 20-25 "Yes" or "No" answers to predictive statements and risking "points" from a limited supply of points (e.g., 5000) provided to every competitor. On each proposition, players can risk from a choice of 250, 500, or 750 "points" (or other number) based on their view of the probabilities of the proposition as it relates to the odds presented by the WinView game producers. The winners are those entrants who "win" the most net points at the end of a quarter long contest (or other time period such as at the end of a half, inning or period, encompassing 20-25 separate In-Play propositions. Again, these skill contests entrants are competing against each other, and the SGO makes its money by charging a management fee. The accuracy of the odds does not affect revenues. In fact a major skill factor making these cash contests legal in 41 states is the competitors' knowledge in recognizing where the odds deviate from what they calculate as the true odds. Nevertheless, the expert live game producers are incentivized and graded by how close each proposition comes to achieving a 50/50% distribution between "Yes" and "No" selections by the participants.

For U.S. sports in the U.S. market these SGO propositions are generally presented during breaks in the action and are left open until the second that play is about to resume with a lock out determined when contestants physically present at the game or receiving the earliest arriving TV signal would begin to gain a competitive advantage. For example, the proposition: "The 56 yd field goal attempt will be made," offered within 25 seconds after the commercial break would be locked out as the ball is snapped based on the observation of an employee physically present at the game or another system adjusting for the difference in the arrival of a TV signal and the Web-delivered game data. This would provide the participants in both the SGO and SBO offerings approximately 45 seconds or 25 seconds at worst to make and enter their selection.

From the time that proposition is offered, such as at a commercial break until the lockout, the SGO receives continuous real-time data on how each contestant is reacting to the odds set by live game producers through their "Yes" or "No" selections. In a matter of 1-2 seconds, the percentage of the SGO participants divided between "Yes" and "No" is obtained to an accuracy of +/−1-2%. If the In-Play odds presented by the SBO were not required to be set and displayed concurrent with the time of presentation, or the presentation of the same proposition with the SBO betting odds were delayed a non-essential 2 seconds, then the utilization of the empirical reaction of the same target market generated by a skill game two-screen operator such as WinView received in real time by the SBO to present to the punter continually changing odds driven by the selections of the competitors the continually changing odds would be an experience very similar to that of pari mutuel horse racing wagering. This format is not a legal game of skill, not the method by which sports betting odds are set, and is illegal under the laws governing both the SGO and the SBO.

Methods and Systems of an SBO, Utilizing an SGO's Real-Time Response of the Betting Universe, to Increase Frequency and Accuracy in Presenting Live In-Play Propositions Example 1. Skill Game operator's 1$^{st}$ Quarter contest: Colts at Patriots. Colts intercept on Patriots' 19 yd line. TV goes to commercial break. SGO operator such as WinView's producers push new proposition 10 seconds later.

"The Colts will score a touchdown on this possession."

Odds: "Yes" 2.5 "No" 1.7

2. Within 0.5 to 2 seconds the SGO (WinView) receives 5000 responses with 30% "Yes" and 70% "No" (accurate +/−2%) and transmits this information via continuous feed to SBO.

3. SBO receives the WinView proposition as published, feeds it into their AI real time system and pushes the same proposition with the same wording to its sports betting audience within 0.1 seconds with odds left blank. Within 1-2 seconds after receiving the cash skill game players' response to the SGO (WinView's) odds from a projectable sample, the SBO's computer systems generate and display their own odds of 2.8 "Yes" and 1.5 "No" calculated to achieve 50/50%.

4. SBO's customers (for example) actually bet 47% "Yes" and 53% "No" on those adjusted odds.

5. Results of this entire transaction plus specific background including teams, date, weather, universe of bettors, and any other relevant information to this specific proposition are entered into both SGO and SBO's databases of their AI computer systems continually and appropriately adjust and store in memory the data to further improve the accuracy of the system expanding the real world data bases. The system will continually improve the accuracy of the system for this proposition not only for the specific teams and game situation but for the entire system.

The systems and methods utilizing the real time information generated by an SGO such as WinView can also be utilized by a sportsbook presenting In-Play and In Running fixed odds proposition betting to significantly balance risk including those described herein.

The methods and systems of notifying and presenting similar or identical individual live betting propositions to the participants utilizing a web connected application offered in live skill games to users are covered in U.S. Provisional Application No. 62/737,653 filed Sep. 27, 2018, and incorporated herein by reference in its entirety. The capabilities described herein are able to be offered on a single web connected application provided by either the SGO, the SBO, or jointly by both the SGO and the SBO, or by the SBO and a third party with appropriate capability.

In one implementation of this application, the SBO would couple the real-time feed providing the percentage of participant's predictions based on their selections of "Yes" or "No" to a known set of fixed odds from the SGO, which would be incorporated into the software systems utilized to generate the fixed odds the SBO is preparing to offer. This real time data would be incorporated into the real time AI systems using neural network technology and utilized as a factor in setting their odds for the same proposition, presented within seconds of the presentation of the SGO's presentation of the same proposition to the same cohort of bettors watching a sports telecast. Depending on the universe of the SGO users, this might range between 1 and 10 seconds with time lag decreasing in proportion to the participant universe.

In another implementation, the SBO would wait until the level of response from the SGO's player universe reached a statistically significant level of response. It would then calculate using either the SBO's algorithm, the SGO's, or a third-party supplier's, the computation of the true 50-50% odds implied by the actual reaction to the odds presented by their live producers. The SGO would then present the proposition with these odds to sports bettors. In this example, the presentation of the SBO's proposition and odds would lag the SGO's presentation of the proposition by the small amount of time it takes to have a sufficient number of responses to be statistically accurate. AI is able to take into account bettor's reactions to SBO and/or SGO propositions and corresponding odds to develop additional propositions and odds and/or update current propositions and/or odds. For example, if Proposition X receives very little action (e.g., very few selections/bets), then similar propositions may not be offered. In some embodiments, the propositions are grouped or classified (e.g., a group related to passing, a group related to running backs, a group related to fun bets, a group related to color/clothing, and so on). For example, a proposition is offered regarding the color of Tom Brady's socks which is in the color/clothing group, and a small percentage of bettors actually bet on that proposition, then other propositions in the color/clothing group are avoided or are only rarely offered or are offered with much higher odds. In some embodiments, taking into account bettors' reactions includes utilizing video/image analysis to determine facial reactions to the propositions. For example, when a proposition appears, a video capture of users' faces are taken and analyzed, and if it is determined that many users' expressions (e.g., above a threshold) are a frown or a look of disgust (as determined by facial recognition/expression recognition), then that proposition and/or similar propositions are not provided. In some embodiments, the facial expressions and the betting history/results are analyzed in combination by the AI. For example, even if many users have a confused expression, if they are still placing wagers, then the AI may still determine to provide an additional similar proposition. Any other analysis is able to be performed to determine bettors' reactions to update and/or provide future propositions and/or odds.

In another implementation, a statistically significant panel of selected paid or unpaid viewers could enter their inputs which would be representative of the larger audience watching the game. This "panel" could also be comprised of expert bookmakers or sports bettors whose collective input would be used.

In another implementation, AI is used to learn based on previous same or similar micro propositions by the SBO. For example, a cohort is provided a first one or more micro propositions, and based on the results of the micro propositions, a second one or more micro propositions are provided to the same cohort or a different cohort. The second one or more micro propositions are able to be the same or similar to the first one or more micro propositions. The AI is used to set the initial odds for the second one or more micro propositions based on the odds of and the response to the first one or more micro propositions. In some embodiments, the micro propositions are independent to the input from the SGO or independent from/of the input from the SGO and the expert panel.

In another implementation the SBO could display with the proposition changing odds driven by either the SGO's live feed or their own feed which incorporates the SGO feed, in a manner similar to the way pari mutuel odds are displayed for horse and dog race wagering as the data changes, the pari mutuel odds change.

In another implementation, the SBO applies AI to the betting cohort to previously offered similar propositions. For example, AI analyzes previous skill game propositions and results from the skill game propositions, in addition to other information, to generate new skill game propositions and/or micro betting propositions.

In another implementation, the SBO applies AI to the reaction to odds set for similar micro betting propositions in the same contest to supplement SBO use of data, mentioned earlier as to how a limited use of AI is now utilized on stats, history, game conditions, but not reaction to their microbets presented earlier to same audience.

In another implementation, the SBO applies AI to the reactions to odds in micro betting propositions for all games in the same sport.

In doing this, the SBO might suspend the acceptance of bets after the score at their server (or any significant odds changing event) while they receive the relevant input from the SGO or any of the other implementations mentioned herein, reset their odds and inform their bettors whether their bets made before or during the suspension were accepted or rejected by the game server, with software and other systems determining whether advantage has been gained by individuals or cohorts of punters.

As shown in the example, this process will involve computer learning, AI and neural networks, and the systems will have the 20/20 hindsight of seeing the results of the odds reset by the SBO in reliance on the SGO data or data from the other implementation mentioned above for different sports and different kinds of propositions. This data is then utilized to continually train and adjust the algorithms using machine learning and neural network technology applying the SGO's feedback mechanism to continually improve accuracy.

The process described herein also addresses separate claims on the collection of the empirical data generated by the SGO on the relationship of the collective reaction to the estimated odds, to the betting response to the recalculated odds utilized and presented by the SBO. The actual betting results from the SBO's proposition are then compared to the response to the odds, then utilized by the SBO and/or the SGO to adjust and perfect the algorithms, both for the specific game in progress and for optimizing the system over time.

An implementation includes an SBO providing a proposition for wagering without odds (e.g., a preview proposition), and also providing the same proposition to the SGO, wherein the SGO receives input in real-time, and based on the input received, provides that information to the SBO who then generates the appropriate odds to be displayed with the previewed proposition. Betting for the SBO proposition may or may not be available until the odds are posted. In a variation the odds provided for the SBO's proposition can be changed before being locked out, or after lockout and then replaced, as is currently being done with live In Running betting where the proposition wording is unchanged, but new odds are presented while the previous odds are locked.

In a similar implementation, instead of a traditional SBO, the live micro betting propositions and the SBO's users reply can be utilized to provide both the proposition and the betting information to a cryptocurrency prediction market operator such as PolyMarket and Kalish, who without the utilization of the system described are limited to markets where the outcome is not resolved in short time periods.

A significant benefit is the ability to offer not only more interesting and attractive propositions tracking the game play, but the ability to offer more custom betting opportunities for each televised game; for example, the very popular propositions with some sense of humor-"If Gronk scores in this quarter his celebratory spin of the football will last more than 8 seconds"—. This system would eliminate the very substantial risk this kind of proposition presents which would have no data to support it.

To summarize, the desired end result of the process is to enable the sports betting operator to make available more frequent, more varied, and more unique micro betting propositions to their customers which will increase engagement and participation. At the same time, the process provides the SBO with a real-time system which not only eliminates the risk in offering in the moment or custom propositions which may be offered more than once in a single athletic contest for which insufficient data exists, but also instantly and accurately predicts the actual response to the target betting audience for that proposition. Live bookmakers may have different goals and strategies to maximize their return on a proposition, which may not necessarily be achieving a risk free 50/50 balance of the book on a prop. They might offer "sucker" odds to take advantage of the fact that the system indicates which team is drawing the strongest backing. The AI driven software system can accurately calculate the risk/reward ratio to the bookmaking strategy for each proposition. Conversely, data generated by the SBO would be sent to the SGO production computer systems to enable more controlled, faster predictable odds setting procedures to provide fun and entertainment as well as odds that enable more skilled competitors to prevail.

FIG. 1 illustrates a flowchart of a method of utilizing SGO data to optimize SBO propositions according to some embodiments. In the step 100, an SGO utilizing live producers provides real-time skill game propositions as described herein (e.g., will the next pass be completed-yes/no). The SGO (or SGO's system) receives responses from participants such as out of the first 10,000 participants, 6,000 participants select "yes," and 4,000 participants select "no." The collected data is then able to be processed and/or communicated to the SBO. In the step 102, the SBO utilizes the collected data (and/or additional data) to generate and present odds/propositions more reflective of true odds based upon the opinions of a sample universe of potential punters/bettors viewing the same contest. In some embodiments, the process is implemented automatically using AI to provide a proposition or the odds for skill game participants, collect the results from those participants and use that data to automatically generate appropriate odds for the same or similar propositions for the live sports betting participants. In some embodiments, the process occurs in a very short amount of time; sometimes under 1 second, much faster than a human could collect the data, analyze the data and provide an output based on the data. In some embodiments, additional or fewer steps are implemented.

Figure 2:
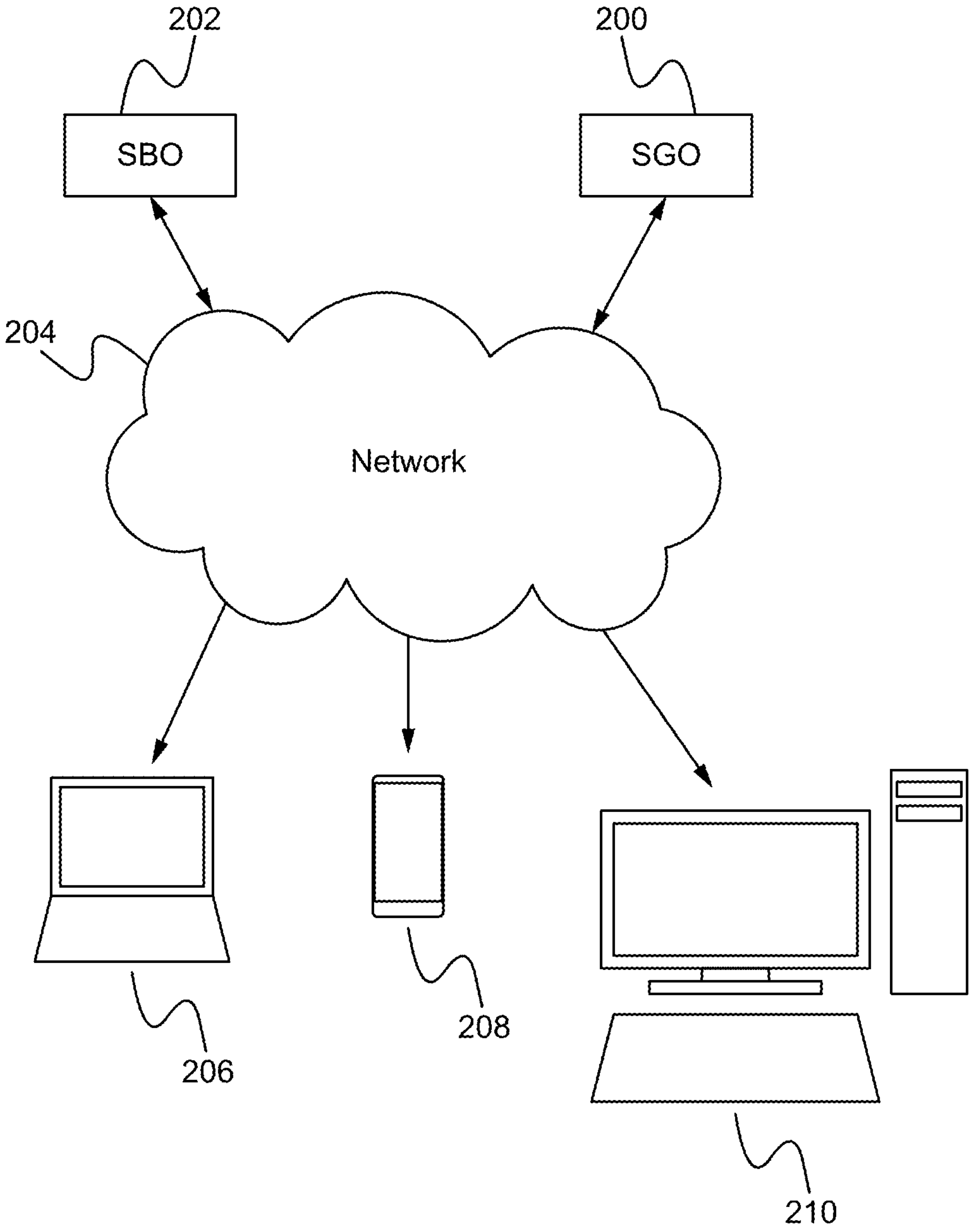
FIG. 2 illustrates a diagram of a network of devices involved in the method of utilizing SGO data to optimize SBO propositions according to some embodiments.

FIG. 2 illustrates a diagram of a network of devices involved in the method of utilizing SGO data to optimize SBO propositions according to some embodiments. An SGO device 200 is utilized to provide SGO propositions and/or receive user input based on the propositions. For example, the SGO device 200 is a game server, or a group of servers configured to generate/host/send/control real-time skill game propositions and receive any communications (e.g., selections/responses) from skill game users/participants.

An SBO device 202 is utilized to provide SBO propositions and/or receive user input based on the propositions. For example, the SBO device 202 is a server or a group of servers configured to generate/host/send/control real-time sports betting propositions and receive any communications (e.g., selections/responses) from sports betting users/participants.

The SGO device 200 and the SBO device 202 are able to communicate with each other as well, directly (e.g., peer-to-peer) or over a network 204 (e.g., the Internet, a LAN, a cellular network). The SGO device 200 is able to send information (e.g., input results from real-time propositions) to the SBO device 202 which then utilizes the information to generate odds for sports betting propositions. The SBO device 202 is able to then communicate the odds to casinos and/or gaming applications to receive wagers on the propositions.

In some embodiments, the SGO device 200 and the SBO device 202 are one device.

Devices such as a laptop 206, a mobile phone 208, a computer 210, a dedicated betting terminal 220, or any other web connected capable devices are able to be used to participate in the skill game competitions and/or the sports betting by sending information (e.g., responses) to and receiving information (e.g., propositions) from the SGO device 200 and/or the SBO device 202.

The devices of the network are able to communicate through the network 204 or directly with each other. A user is able to use the computer 210, a television, the mobile phone 208 and/or any other device to perform tasks such as to join competitions, view betting odds, provide selections for propositions, watch events (e.g., sports) and/or any other tasks.

In some embodiments, fewer or additional devices are able to be included in the network of devices. The network of devices is able to include any number of devices. For example, the network of devices is able to include a smart television with an internet connection.

Figure 3:
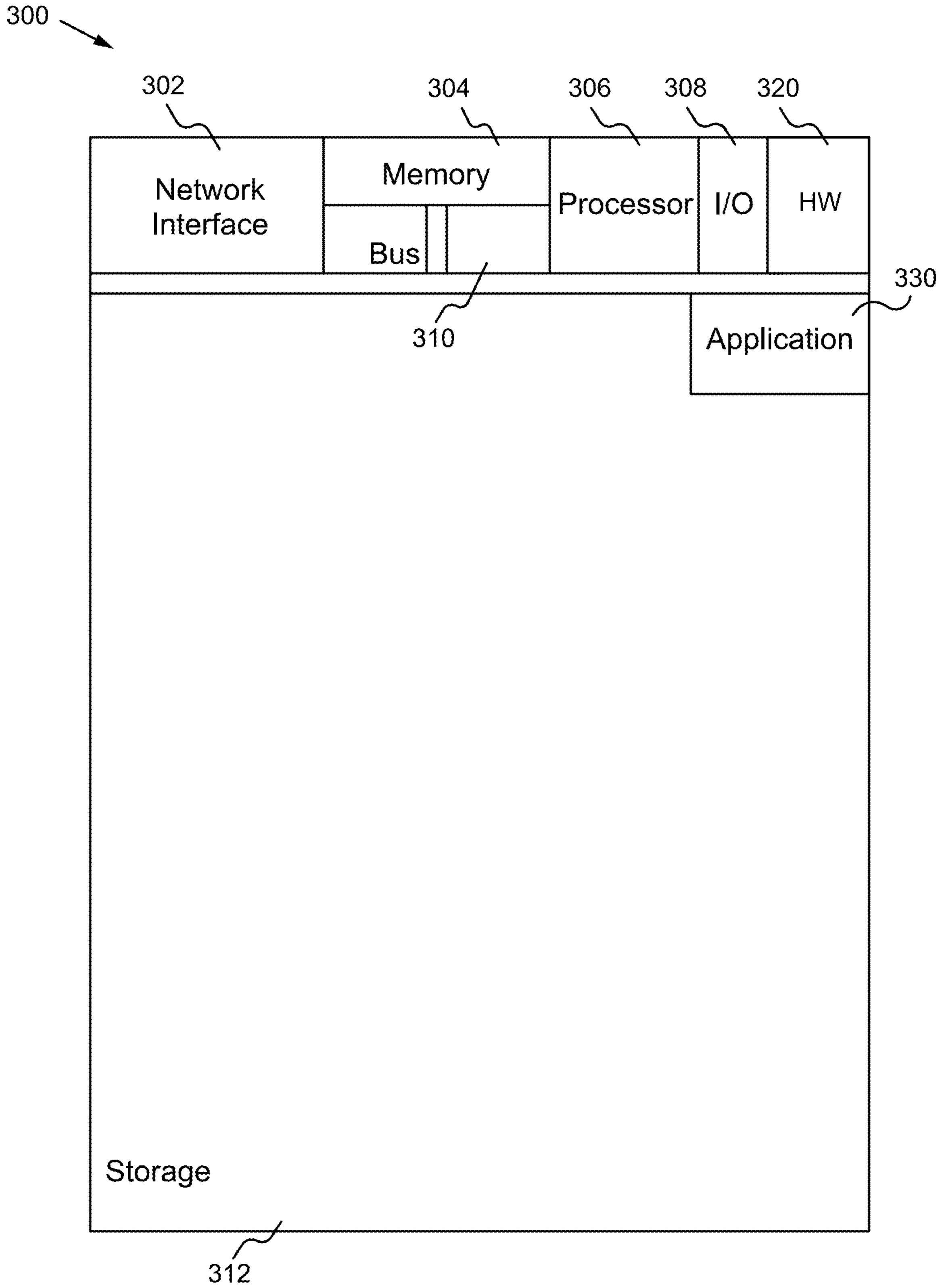
FIG. 3 illustrates a block diagram of an exemplary computing device configured for implementing the method of utilizing SGO data to optimize SBO propositions according to some embodiments.

FIG. 3 illustrates a block diagram of an exemplary computing device configured for implementing the method of utilizing SGO data to optimize SBO propositions according to some embodiments. The computing device 300 is able to be used to acquire, store, compute, process, communicate and/or display information. In general, a hardware structure suitable for implementing the computing device 300 includes a network interface 302, a memory 304, a processor 306, I/O device(s) 308, a bus 310 and a storage device 312. The choice of processor is not critical as long as a suitable processor with sufficient speed is chosen. The memory 304 is able to be any conventional computer memory known in the art. The storage device 312 is able to include a hard drive, CDROM, CDRW, DVD, DVDRW, High Definition disc/drive, ultra-HD drive, flash memory card or any other storage device. The computing device 300 is able to include one or more network interfaces 302. An example of a network interface includes a network card connected to an Ethernet or other type of LAN. The I/O device(s) 308 are able to include one or more of the following: keyboard, mouse, monitor, screen, printer, modem, touchscreen, button interface and other devices. SGO/SBO proposition application(s) 330 used to perform the SGO/SBO proposition method are likely to be stored in the storage device 312 and memory 304 and processed as applications are typically processed. More or fewer components shown in FIG. 3 are able to be included in the computing device 300. In some embodiments, SGO/SBO proposition hardware 320 is included. Although the computing device 300 in FIG. 3 includes applications 330 and hardware 320 for the SGO/SBO proposition method, the SGO/SBO proposition method is able to be implemented on a computing device in hardware, firmware, software or any combination thereof. For example, in some embodiments, the SGO/SBO proposition applications 330 are programmed in a memory and executed using a processor. In another example, in some embodiments, the SGO/SBO proposition method is programmed hardware logic including gates specifically designed to implement the SGO/SBO proposition method.

In some embodiments, the SGO/SBO proposition application(s) 330 include several applications and/or modules. In some embodiments, modules include one or more submodules as well. In some embodiments, fewer or additional modules are able to be included.

Examples of suitable computing devices include a personal computer, a laptop computer, a computer workstation, a dedicated betting terminal, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high-definition disc writer/player), a television, a home entertainment system, an augmented reality device, a virtual reality device, smart jewelry (e.g., smart watch) or any other suitable computing device.

Figure 4:
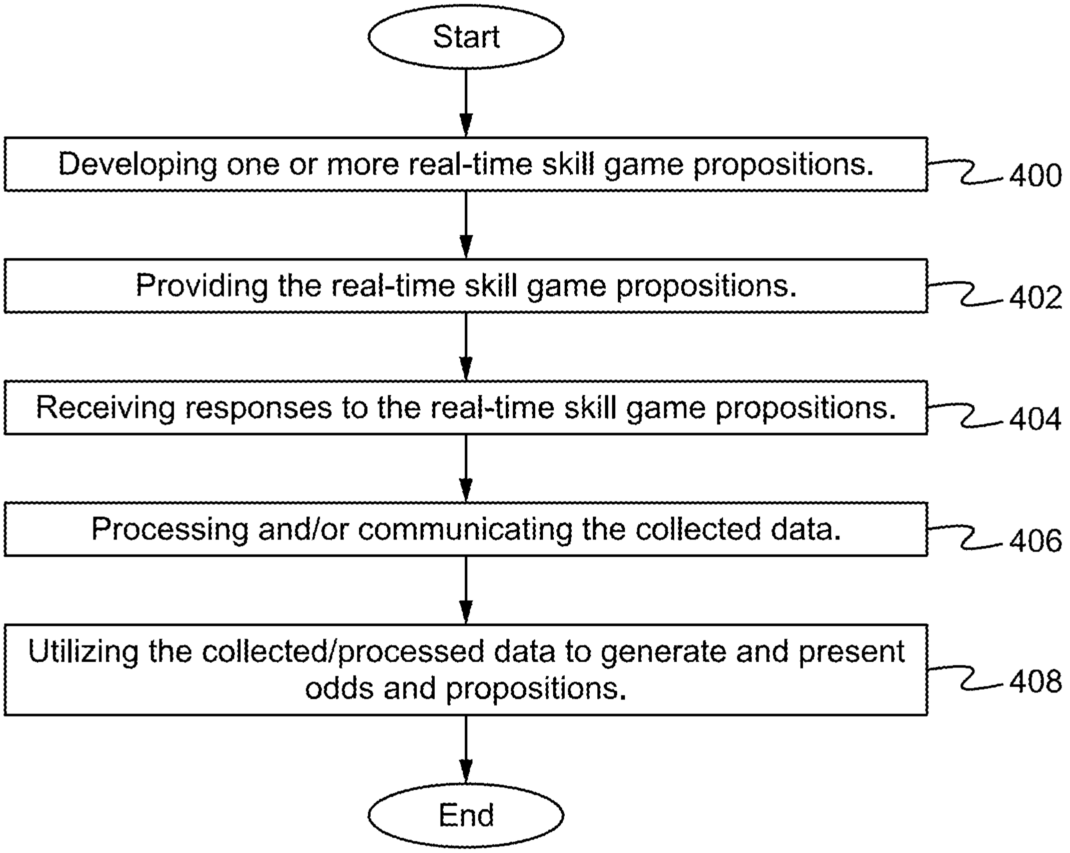
FIG. 4 illustrates a flowchart of a method of utilizing SGO data and artificial intelligence to optimize SBO propositions according to some embodiments.

FIG. 4 illustrates a flowchart of a method of utilizing SGO data and AI to optimize SBO propositions according to some embodiments. In the step 400, one or more real-time skill game propositions are developed. For example, a set of 20 real-time skill game propositions are generated and organized so that they are easily displayed at a specific time/situation. The real-time skill game propositions are able to be generated manually by a producer or automatically using AI. For example, using AI, a device acquires event-related information such as the weather, current player statistics, current event information (e.g., in football, the down and distance and time remaining), historical information, and/or any other information. The information is able to be very specific or organized such that cross-references are able to be generated or determined. For example, the data is able to be stored in a manner such that when a quarterback is playing in a game that is going to be very cold, past historical information, including specifically cold-weather games, is able to be located. The device is able to acquire the information from one or multiple sources. The AI utilizes structures and neural networks to learn based on additional information (e.g., received daily or weekly). For example, the device using AI generates a structure/object using object oriented programming for each player and/or event and collects data for the player/event to develop the structure/object. As additional information is acquired regarding a player and/or event, the structure/object is able to be modified and/or grow. The developed structure/object is able to be utilized in determining a real-time skill game proposition. For example, if the quarterback has thrown 8 consecutive incomplete passes, a real-time skill game proposition could inquire whether the next pass will be completed, or since viewers may be aware of the quarterback's struggles, the real-time skill game proposition would avoid asking a pass question since most users would likely assume that he will not complete the next pass, so a question about running with the football is able to be asked or a more general question about passing could be asked, such as "will the quarterback complete at least one pass on the next drive?"

In the step 402, an SGO provides real-time skill game propositions as described herein (e.g., will the next pass be completed-yes/no). The real-time skill game propositions are presented in any manner such as displayed directly on the user's television or displayed on a mobile device (e.g., cellular/smart phone, tablet, smart watch) or other device such as a laptop computer or personal computer. In some embodiments, a countdown is provided with each real-time skill game proposition. The real-time skill game propositions are able to be presented for a limited amount of time (e.g., 3 or fewer seconds, 5 seconds, 30 seconds or more). In some embodiments, factors may affect how long the real-time skill game propositions are presented, such as delays in receiving a televised/broadcast/Internet signal.

In the step 404, the SGO (or SGO's system) receives responses from participants, such as out of the first 10,000 participants, 6,000 participants select "yes," and 4,000 participants select "no." The participants are able to provide their selections through any user interface provided. The user interface is able to be a complex web page providing vast amounts of statistical data in addition to the propositions and buttons to select a response. The user interface is able to be a simple app that is displayed on a mobile phone or smart watch which shows each real-time skill game proposition in conjunction with a "yes" button and a "no" button. Any GUI features are able to be utilized. Any programming language is able to be utilized. In some embodiments, instead of or in addition to yes/no selections, other types of selections are possible such as true/false, multiple choice from (3, 4 or more choices) and/or others.

In the step 406, the collected data is then able to be processed and/or communicated to the SBO. The data is processed to detect for patterns and/or make calculations as well as for any other purposes (e.g., to process the real-time skill game propositions). For example, the percentage of "yes" versus "no" selections are determined which is then used to affect odds of other propositions. As described herein, a formula is able to be used which takes a first set of odds (e.g., initially generated manually by an employee at a sportsbook or utilizing AI) and then adjust the first set of odds based on the results of the real-time skill game propositions. In some embodiments, pattern recognition is implemented to determine if any users are cheating or performing the same selection repeatedly. For example, if the selection history of User A shows all "no" selections, then those selections should be ignored when performing the calculations as there does not appear to be a valid and fair attempt at making a selection.

In the step 408, the SBO utilizes the collected/processed data (and/or additional data) to generate and present odds/propositions more reflective of true odds based upon the opinions of a sample universe of potential punters/bettors viewing the same contest. The odds are for the same or similar propositions for the live sports betting participants. For example, if an SGO generates a question: "Will Team X score on its next possession?" an SBO will provide the same or a comparable question/proposition. The odds for the SBO proposition will be affected based on the input received for the SGO question. Furthering the example, the initial odds for the proposition are "yes" 2.5 and "no" 1.7, but based on responses to the SGO question which are 30% "yes" and 70% "no," the odds for the proposition are changed to "yes" 2.8 and "no" 1.5, so that the betting on the proposition is closer to 50% for either option of the bet. In some embodiments, the process occurs in a very short amount of time; sometimes under 1 second, much faster than a human could collect the data, analyze the data and provide an output based on the data. In some embodiments, additional or fewer steps are implemented.

To use the method of utilizing SGO data to optimize SBO propositions, operators receive data based on skill game propositions and then base sports bet propositions (including odds) on that data. Users are able to participate in the skill game competitions and the sports bet propositions.

In operation, the method of utilizing SGO data to optimize SBO propositions enables that which is impossible without it. In particular, to determine proper, accurate odds for unique situational In-Play propositions, significant real-time data must be collected and analyzed in real time, which is not possible without a computing device, and is significantly improved by utilizing skill game information, where the skill game information is collected from thousands or millions of users across the globe.

Although skill game propositions and In-Play propositions have been described herein, any type of propositions are able to be implemented.

The method, devices and systems described herein are able to implement additional features such as age verification, user location verification (e.g., determining a physical, geographical location of a user/device based on GPS information or other information, and using the geographical location to determine if the laws in that location permit the activity/gaming/service), user home address verification, receiving credit card information, receiving wagering options, providing prizes and/or other winnings, cheating detection, and/or any other features described herein or incorporated by reference herein.

The event for which the propositions are made is able to be: a televised-event, live event, broadcast event, Internet-broadcast event, a single competition, multiple genres of athletic or other types of contests, multiple competitions taking place at the same time, in a single day, week or season, a partial contest, an arbitrary or specific segment of an athletic or other type of contest, sport-based contests, non-sport-based contests, a weekly event, a week-long event, a competitive game show, a television show, a movie, a video, an electronic sports (e-sports) event, card, dice, trivia, math, word, and/or puzzle games, a television-based event, a scheduled competition, a scheduled series of competitions, a sporting event, a real-time skill and chance-based sports prediction games, an event based on a video game, a computer game or electronic game, an entertainment show, a taped event, a game show, a reality show, a news show, a commercial contained in a broadcast, and/or any other events described herein or incorporated by reference herein.

The event is able to be attended by a user and/or an employee with a device to trigger lockout signals or otherwise control when selections are able to be made and/or blocked.

In some embodiments, the devices and/or servers are optimized to implement the odds setting implementations. For example, data that is accessed more frequently is stored on faster access storage (e.g., RAM as opposed to slower storage devices). Furthering the example, the data relevant for the current week is stored on faster access storage, and data from past weeks is stored on slower storage devices. In another example, when a user selects a competition/contest, information related to that competition/contest is moved to local storage for faster access.

For the real-time skill-game propositions, latency issues could possibly give some users an unfair advantage. The latency issues are solved through a system and method to effectively equalize systemic propagation delay variances to a required level dictated by the demands and rules of a particular game, so that a material competitive advantage is not obtained, and the user experience is optimized for all players.

The solution includes first determining how each viewer is receiving their television signal (e.g. via an over the air broadcast in a metropolitan area, via a particular cable system or a particular satellite system, via streaming). All subscribers to a particular service provider or who are receiving an over the air broadcast in a specific metropolitan area will receive the signal at their location at the same time. It is also able to be determined if there is further processing of the signal within the homes, office, bar and others, which could further increase the total length of the propagation delay. Examples would be the use of a DVR, such as TiVo™. A variety of methodologies are able to be utilized to determine the time difference between the reception of the television picture being utilized by the central game production facility where "lock out" signals are generated and each separate group of viewers around the country or around the world.

One approach is to survey the delays encountered through the various delivery systems such as cable, over the air or satellite in various geographic areas and adjust the synchronization of the game control information for all players to optimize the game play experience while defeating cheating enabled by receiving late lock outs to questions.

In another approach, the total viewing population for a telecast is divided into segments or blocks of viewers referred to as "cohorts." For example, the 2 million inhabitants of the San Francisco Bay Area would be divided into approximately 1 over the air broadcast, 3 satellite independent providers and several cable "head ends" or central broadcast points serving a "cohort." This information would be gathered at a central game server, and all players registered to play in a particular contest would be assigned to a specific cohort of viewers.

The following are some other methodologies for determining the delays experienced by various cohorts who are able to be used in combination or separately.

In one methodology, upon joining the service and prior to initial game play, subscribers and competitors are required to identify the method by which they receive their television signal and identify the cable or satellite service provider and answer questions relative to whether or not they subscribe to an analog or digital high definition service or utilize a DVR. This information is able to be verified by sending questions to their cellular phones concerning commercials, station breaks and the precise time they are viewed or utilizing other information only seen by members of that cohort.

In another methodology, a routine is established upon first entry into a game where the individual viewer is asked to mark the precise time a predetermined audio or visual event in the television program occurs, such as the initial kickoff, which would establish the deviation of their receipt of their television picture from the television signal utilized by the game producers. While some viewers might attempt to cheat by delaying their input, the earliest entries from the cohorts in this group would be averaged to establish the accurate delta between the receipt of the telecast/stream by the production crew and those in each discrete sub-group of viewers.

In another methodology, the GPS function in the cellular phone is used to determine the physical location of a viewer which is matched to a database of cable lead ends or over the air broadcast stations available to a consumer in that precise location.

In another methodology, employees of the game producer who are members of the subgroups which constitute the competitors/viewers, e.g. a subscriber to Comcast Cable in San Francisco, are utilized by the game service provider. These individuals would provide the current propagation delay information sent to the game server utilizing their identification of a recognizable event they observe on their television set, such as the initial snap of the ball.

In another methodology, audio or video artifacts or information done in cooperation with the television signal provider are inserted which must be immediately responded to by the competitor to verify the source of their television signal or monitored at cooperative viewers' television sets.

In another methodology, the various delays through an automated system linked to the game server, which continuously samples the audio or video track of the underlying satellite, cable or over the air broadcast television signals are established around the country to provide the information of the precise arrival of the underlying television picture.

Utilizing software resident in a game control server, game control data for each set of viewers/competitors of the game in progress who are receiving their television picture or streaming content through the same source are batched together by the game control server, and the appropriate delay is either time stamped on the game "lock out" signals, or is imposed on the entire data stream so that competitors receiving their content slightly behind or ahead of others gain no material competitive advantage. Another method is for the game control server to send all the game control data to all of the viewers/competitors of the game at the same time, and the client software is able to delay the presentation of the game data based on the viewers' cohort.

Utilizing these methodologies to measure the delays in each cohort, each cohort of viewers would have artificial time delays on the game control information imposed by the game control server, which would substantially equalize the receipt of "lock out" data relative to the event triggering the "lock out," based on the underlying television programming, for example, the snap of the football. Players receiving the television signals or streaming content in advance of the one with the slowest receipt of the television signal or streaming content would receive "lock out" signals slightly delayed or time stamped with a slightly later time as described in U.S. Pat. No. 4,592,546. By providing a correspondingly delayed lock out to a viewer receiving their signal later, a potential advantage is mitigated.

Alternatively, this time equalization from cohort to cohort could, for example, involve artificially delaying the transmission of the game control data stream sent to all competitors' cell phones or other mobile devices by the appropriate amount of seconds, to sufficiently minimize the advantage a player with a few more seconds of television-based (or streaming-based) information would have. For example, by time stamping the "lock out" signal at an earlier event, such as when the team breaks from the huddle, the chance of some cohorts seeing the actual beginning of the play is eliminated and the discrepancy in propagation delay provides little or no advantage.

In some embodiments, the SGO data (e.g., propositions and odds) is provided to an SBO app. In some embodiments, the SGO implements an app which utilizes the SGO data to provide propositions (e.g., real-time skill game and In-Play) and odds through the app. In some embodiments, hot links are provided to partnering apps. In some embodiments, the SGO populates a database with propositions, proposition selections/results, team information, player information, historical data, and/or any other information, and makes the database/information accessible in real-time to licensed bookmakers to generate odds and/or propositions.

Figure 5:
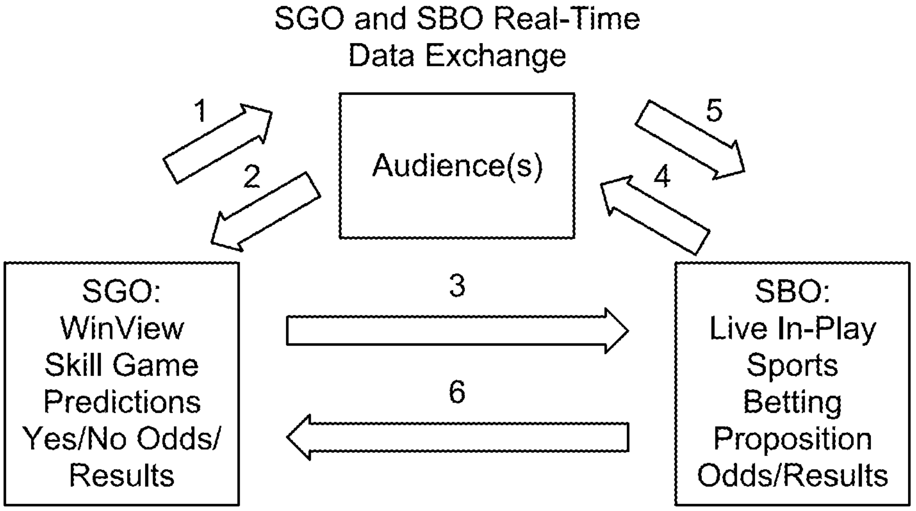
FIG. 5 illustrates a diagram of reducing risk in setting odds according to some embodiments.

FIG. 5 illustrates a diagram of reducing risk in setting odds according to some embodiments. The SGO provides propositions (e.g., yes/no predictions) and/or odds to an audience (e.g., competitors for a real-time game of skill). The audience provides feedback to the SGO such as responses to the propositions based on the specific propositions and/or odds. The SGO provides the feedback/results to an SBO. The SBO provides propositions (e.g., sports betting propositions) and/or odds to the audience. The audience for the SBO propositions is able to be the same audience for the SGO propositions, a different audience, or any combination thereof. The SBO receives the results from the propositions. The results from the SBO propositions are able to be sent to the SGO to update an algorithm for providing the SGO propositions and/or odds. The data provided and received by the SGO, the SBO and the audience is able to be used in any manner by AI, one or more learning algorithms, and/or any other analytical system to optimize the accuracy and efficiency of the betting operation (e.g., such that 50% of the audience selects one side of a proposition, and the other 50% of the audience selects the other side of the proposition).

As shown in the example, this process will involve computer learning, AI and neural networks, and the systems will have the 20/20 hindsight of seeing the results of the odds reset by the SBO in reliance on the SGO data for different sports and different kinds of propositions. This data is then utilized to continually train and adjust the algorithms using machine learning and neural network technology applying the SGO's feedback mechanism to continually improve accuracy.

The process described herein also addresses separate claims on the collection of the empirical data generated by the SGO on the relationship of the collective reaction to the estimated odds, to the betting response to the recalculated odds utilized and presented by the SBO. The actual betting results from the SBO's proposition are then compared to the response to the odds, then utilized by the SBO and/or the SGO to adjust and perfect the algorithms, both for the specific game in progress and for optimizing the system over time.

Figure 6:
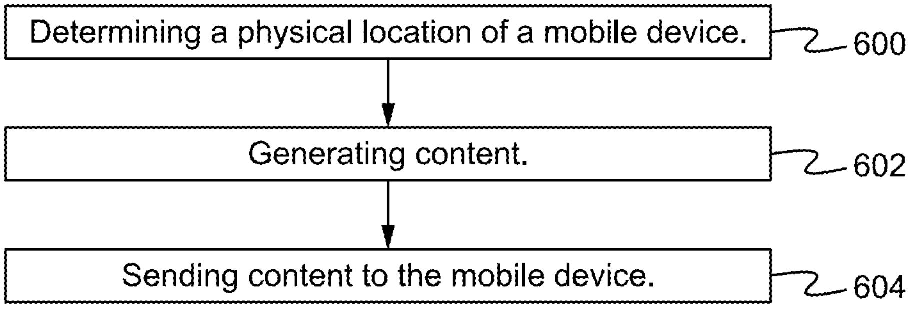
FIG. 6 illustrates a flowchart of a method of utilizing artificial intelligence to optimize propositions according to some embodiments.

FIG. 6 illustrates a flowchart of a method of utilizing AI to optimize propositions according to some embodiments. In the step 600, a physical location of a mobile device is determined. The physical location of the mobile device is able to be determined in any manner such as using GPS. In some embodiments, physical locations of non-mobile devices are determined.

In the step 602, content is generated at a device (e.g., server). The content is generated as described herein. For example, AI is utilized to generate skill game propositions, micro betting propositions, and odds corresponding to the micro betting propositions.

In the step 604, the content is sent to the mobile device (or non-mobile device) from a remote device (e.g., server). The content is able to include a sports betting game of chance, where the game of chance includes presenting live, In play, and micro betting propositions simultaneously to sports betting cohorts wagering on the same athletic contest. The odds presented to the cohorts for a new proposition are in part adjusted by analysis utilizing neural networks, and/or AI and/or machine learning applied to the results of previous propositions from the same cohort betting on the same game of chance. The analysis is provided by one or more of the following resources: a skill game operator, a selected sample of the cohort, a cohort of recruited experts, a sports book operator's accumulated data, and a third party data and odds supplier. In some embodiments, fewer or additional steps are implemented.

Figure 7:
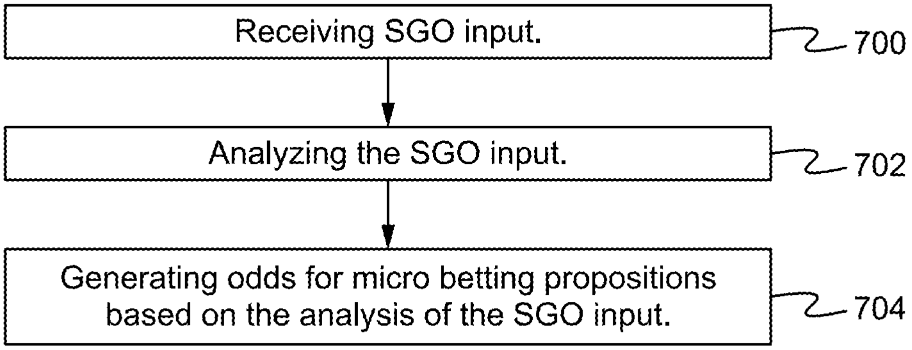
FIG. 7 illustrates a flowchart of a method of utilizing SGO input to optimize micro betting propositions according to some embodiments.

FIG. 7 illustrates a flowchart of a method of utilizing SGO input to optimize micro betting propositions according to some embodiments. In the step 700, SGO input is received. The SGO input is able to include the SGO propositions and/or selections by users of the skill game propositions. In the step 702, the SGO input is analyzed. Analyzing the SGO input is able to include comparing selections related to the skill game propositions with results related to those skill game propositions. In the step 704, odds for micro betting propositions are generated based on the analysis of the SGO input. In some embodiments, AI and machine learning are used to perform the steps herein such as analyzing the SGO input and generating odds for the micro betting propositions. In some embodiments, fewer or additional steps are implemented. For example, in addition to generating odds for the micro betting propositions, the odds are continuously modified based on the ongoing analysis of the SGO input. In another example, the AI generates the micro betting propositions in addition to the odds for the micro betting propositions.

Figure 8:
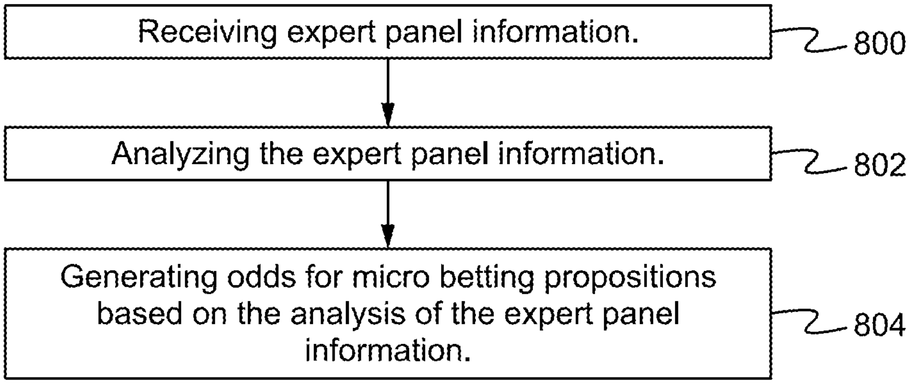
FIG. 8 illustrates a flowchart of a method of utilizing an expert panel to optimize micro betting propositions according to some embodiments.

FIG. 8 illustrates a flowchart of a method of utilizing an expert panel to optimize micro betting propositions according to some embodiments. In the step 800, an expert panel provides information. The expert panel information is able to include the SGO propositions and/or selections to the skill game propositions. In the step 802, the expert panel information is analyzed. Analyzing the expert panel information is able to include comparing selections related to the skill game propositions with results related to those skill game propositions. In the step 804, odds for micro betting propositions are generated based on the analysis of the expert panel information. In some embodiments, AI and machine learning are used to perform the steps herein such as analyzing the expert panel information and generating odds for the micro betting propositions. In some embodiments, fewer or additional steps are implemented.

Figure 9:
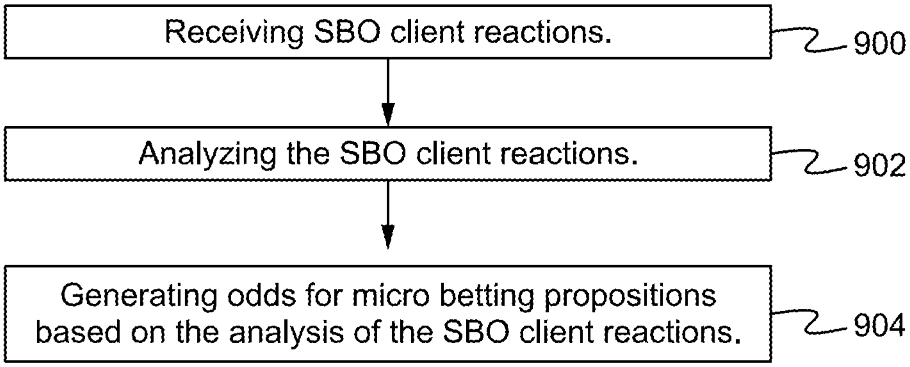
FIG. 9 illustrates a flowchart of a method of utilizing SBO clients' reactions to optimize micro betting propositions according to some embodiments.

FIG. 9 illustrates a flowchart of a method of utilizing SBO clients' reactions to optimize micro betting propositions according to some embodiments. In the step 900, SBO client reactions are received. The SBO client reactions are the prior bets made and/or the results of the bets for previous micro betting propositions. In the step 902, the SBO client reactions are analyzed. For example, it is determined that the majority of the bets were placed on Team X to score on the current drive. In another example, it is determined that 75% of the bettors bet that Team Y was not going to score, and they were correct. In the step 904, odds for current or up-coming micro betting propositions are generated based on the analysis of the SBO client reactions. For example, if bettors previously bet heavily that Team Y will not score on the current possession, then that information is able to be used to adjust the next propositions and/or odds accordingly. In some embodiments, AI and machine learning are used to perform the steps herein, such as analyzing the SBO client reactions and generating odds for the micro betting propositions. Specifically, the AI is able to perform analysis based on recent previous bets and results and adjusts the odds such that the current and future bets are more balanced initially without adjustments (e.g., roughly 50% of the bets are for the "yes" or "over" side of the proposition, and roughly 50% of the bets are for the "no" or "under" side of the proposition). Additional variations are possible, such as attempting to achieve a roughly 50/50 split in terms of money and not the number of bets for each side. Similarly, in some embodiments, if more than two options are possible, such as which player will score the next touchdown, the AI adjusts the propositions and/or odds to achieve an even split among the options (e.g., approximately 25% split among 4 options). In some embodiments, fewer or additional steps are implemented. For example, in addition to generating odds for the micro betting propositions, the odds are continuously modified based on the ongoing analysis of the SBO client reactions. In another example, the AI is used in the process of generating the micro betting propositions in addition to setting the odds for the micro betting propositions.

AI, especially through machine learning, allows for continuous, real-time learning. AI systems analyze patterns from vast amounts of data, learning from outcomes, player performance, weather conditions, and betting behavior. This leads to more dynamic and accurate odds that adapt as new data streams in. AI excels at processing massive datasets far more efficiently than manual methods or static algorithms. The AI is able to simultaneously consider multiple factors-such as player injuries, team dynamics, historical performance, and real-time game conditions-on a much larger scale, leading to more precise odds. Machine learning algorithms are able to detect complex patterns and correlations that are often missed by traditional statistical models. AI improves prediction accuracy by continuously refining its models based on feedback loops from actual game results, improving its odds-setting precision. AI automates the process of odds setting, reducing the need for human intervention. This is particularly advantageous in managing live betting, where odds need to be adjusted rapidly as events unfold. The AI-driven models and processes automatically adjust odds, incorporate new forms of data, and interact with betting behaviors. AI introduces not just speed and scalability but also a learning capability that traditional models lack, making odds-setting more responsive and data-driven.

AI is used to analyze any data that is able to be used to calculate odds (e.g., for a micro betting proposition). The data is able to include team information (historical or present), player information (historical or present), weather information, arena/stadium information, injury information, and/or any other information. The data is able to include past or present odds information. The data is able to include skill game proposition information and micro betting propositions information. The data is also able to include bettor information, for example, reactions to propositions.

AI is used to analyze data described herein to generate skill game propositions. For example, the AI generates a skill game proposition of whether the next play will be a pass or run. While the skill game proposition is available, the AI analyzes the selections by the users (or a subset of the users). The AI is able to use the received selections to provide additional skill game propositions such as determining how long the pass or run will be or if there will be a turnover. The AI is able to be used to provide live action skill game propositions such as asking while the running back has the ball and is running, which player will tackle him or if there will be a turnover. After the play is over, the AI analyzes the results of the selections to generate additional skill game propositions. The AI is also able to provide awards and perform other skill game gameplay for the users of the skill game.

The AI is also able to determine which users receive which skill game propositions. For example, AI separates users into cohorts or groups based on skill level related to the results of their selections. The AI is then able to provide different skill game propositions based on the cohorts (e.g., expert skill level users receive more difficult than beginner skill level users). The AI is also able to group users based on their location, signal reception device, and/or any other distinguishing factor. For example, users in California are grouped in a different group than users in Nevada. Similarly, users watching the game on their phone are grouped in a different group than those watching the game in person. Any number of groups based on various factors are able to be generated. The AI is able to use the data from the different cohorts in different manners. For example, to generate odds for micro betting propositions, the AI only uses data collected by skills game propositions posed to expert-level users. The AI is able to generate separate cohorts for the purpose of providing different questions to the different cohorts to enable additional micro betting propositions.

The AI uses the data collected from the skill game propositions to generate micro betting propositions and odds for the micro betting propositions. For example, the AI is able to generate a micro betting proposition of the number of points Player X will score in the game or which player will score the next touchdown with corresponding odds. The odds for the micro betting propositions are able to be based on previous selections and results of the skill game propositions. The odds are able to change based on the current selections to the skill game propositions. The odds are able to change based on the wagers on the micro betting propositions. The odds changes are able to occur in real-time as the AI is able to process any changes in data nearly instantaneously. Additional micro betting propositions are able to be generated during game play based on events in the game (e.g., change of possession, penalty/foul, time, score, injury, line change/player replacement, and others). For example, if one of the current micro betting propositions is: will Player Y score 2+ touchdowns—the odds for the micro betting proposition may go down if Player Y's team is about to score; the odds will go down if Player Y just scored, or the odds will go up if the opposing team has the ball with a limited amount of time left on the clock. After a micro betting proposition has ended, one or more additional micro betting propositions are able to be generated based on the results of the ended micro betting proposition. For example, if Player Z just scored a touchdown, a new micro betting proposition is able to be generated asking: will Player Z score another touchdown. The odds of the new micro betting proposition are able to factor in the wagers and/or the odds of the previous micro betting proposition. As described, the AI is continuously receiving and processing all of the data related to an event (e.g., sporting event) to modify the micro betting odds and generate new micro betting propositions and odds.

The AI is able to be trained initially with historical data, including historical skills game propositions and micro betting propositions and odds, such that it is able to optimize the odds making. Additionally, the AI is able to continuously learn from new data as more information becomes available. For example, people's types of wagers or wagering strategies may change over time, so the AI is able to learn and adapt to provide the most accurate propositions and odds to achieve a desired goal (e.g., earning the makers of the propositions the most money).

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:

determining a physical location of a mobile device;

sending content to the mobile device, wherein the content includes a game of chance including one or more micro betting propositions with odds simultaneously presented to sports betting cohorts wagering on a sports contest, wherein the odds presented to the sports betting cohorts are in part adjusted by analysis utilizing artificial intelligence and machine learning applied to results of previous micro betting propositions from the same sports betting cohort betting on the sports contest, wherein the artificial intelligence generates a structure using object oriented programming for each wagerable event in a sporting event, further wherein the artificial intelligence collects real-time data to update the odds for the one or more micro betting propositions.

2. The method of claim 1 wherein the physical location of the mobile device is determined using GPS.

3. The method of claim 1 wherein analysis is provided by one or more of the following resources: a skill game operator, a selected sample of the cohort, a cohort of recruited experts, a sports book operator's accumulated data on micro betting in the same sports contest, and/or a third party data and odds supplier.

4. The method of claim 1 wherein the artificial intelligence generates the odds within a 5-second window from generating a micro betting proposition.

5. The method of claim 1 further comprising generating the odds, wherein generating the odds includes analyzing one or more reactions to a micro betting proposition by one or more bettors.

6. The method of claim 5 wherein analyzing the one or more reactions of the one or more bettors includes utilizing video analysis to determine facial reactions to the propositions.

7. The method of claim 1 wherein the artificial intelligence adjusts the odds based on unfolding events.

8. The method of claim 1 further comprising training the artificial intelligence with historical information, and continuously learning with the artificial intelligence with new information.

9. The method of claim 1 further comprising implementing pattern recognition to determine cheating by a user.

10. A server device comprising:

a non-transitory memory configured for storing an application, the application configured for:

determining a physical location of a mobile device;

sending content to the mobile device, wherein the content includes a game of chance including one or more micro betting propositions with odds simultaneously presented to sports betting cohorts wagering on a sports contest, wherein the odds presented to the sports betting cohorts are in part adjusted by analysis utilizing artificial intelligence applied to results of previous micro betting propositions from the same sports betting cohort betting on the same game of chance, wherein the artificial intelligence generates a structure using object oriented programming for each wagerable event in a sporting event, further wherein the artificial intelligence collects real-time data to update the odds for the one or more micro betting propositions; and a processor configured for processing the application.

11. The server device of claim 10 wherein the physical location of the mobile device is determined using GPS.

12. The server device of claim 10 wherein analysis of the same game and betting activity is provided by one or more of the following resources: a skill game operator, a selected sample of the cohort, a cohort of recruited experts, a sports book operator's accumulated data, and a third party data and odds supplier.

13. The server device of claim 10 wherein the artificial intelligence generates the odds within a 5-second window from generating a micro betting proposition.

14. The server device of claim 10 further comprising generating the odds, wherein generating the odds includes analyzing one or more reactions to a micro betting proposition by one or more bettors.

15. The server device of claim 14 wherein analyzing the one or more reactions of the one or more bettors includes utilizing video analysis to determine facial reactions to the propositions.

16. The server device of claim 10 further comprising training the artificial intelligence with historical information, and continuously learning with the artificial intelligence with new information.

17. The server device of claim 10 further comprising implementing pattern recognition to determine cheating by a user.

18. A method programmed in a non-transitory memory of a device comprising:

determining a physical location of a mobile device;

sending content to the mobile device, wherein the content includes a game of chance including one or more micro betting propositions with odds simultaneously presented to sports betting cohorts wagering on a sports contest, wherein the odds presented to the sports betting cohorts are in part adjusted by analysis utilizing artificial intelligence and machine learning applied to results of previous micro betting propositions from the same sports betting cohort betting on the same game of chance, wherein the artificial intelligence adjusts the odds based on unfolding events and a decrementing game clock, wherein analysis is provided by previous micro betting during a single contest by one or more of the following resources:

a skill game operator, a selected sample of the cohort, a cohort of recruited experts, a sports book operator's accumulated game betting data, and a third party data and odds supplier, wherein the artificial intelligence generates a structure using object oriented programming for each wagerable event in a sporting event, further wherein the artificial intelligence collects real-time data to update the odds for the one or more micro betting propositions.

19. The method of claim 18 further comprising generating the odds, wherein generating the odds includes analyzing one or more reactions to a micro betting proposition by one or more bettors.

20. The method of claim 19 wherein analyzing the one or more reactions of the one or more bettors includes utilizing video analysis to determine facial reactions to the propositions.

21. The method of claim 18 further comprising training the artificial intelligence with machine learning based on historical information, and continuously presenting with the artificial intelligence programs with new information.

22. The method of claim 18 further comprising implementing pattern recognition to determine cheating by a user.

* * * * *